(12) United States Patent
Ferlitsch (10) Patent No.: US 7,218,409 B2
(45) Date of Patent: May 15, 2007

(54) PEER-TO-PEER, PLURAL-COMPUTING-DEVICE RENDERING/RASTERIZING STRUCTURE AND METHODOLOGY FOR GRID-DISTRIBUTED PRINTING

(75) Inventor: Andrew Rodney Ferlitsch, Tigard, OR (US)

(73) Assignee: Sharp Laboratories of America, Inc., Camas, WA (US)

( * ) Notice: Subject to any disclaimer, the term of this patent is extended or adjusted under 35 U.S.C. 154(b) by 968 days.

(21) Appl. No.: 10/140,446

(22) Filed: May 6, 2002

(65) Prior Publication Data
US 2003/0206313 A1  Nov. 6, 2003

(51) Int. Cl.
*G06F 3/12* (2006.01)
(52) U.S. Cl. ............... 358/1.15; 358/1.13; 358/1.2; 358/1.14; 358/1.16
(58) Field of Classification Search ........... 358/1.15, 358/1.2, 1.13, 1.16
See application file for complete search history.

(56) References Cited

U.S. PATENT DOCUMENTS

| | | | | |
|---|---|---|---|---|
| 5,333,246 A | * | 7/1994 | Nagasaka | 345/619 |
| 5,594,860 A | * | 1/1997 | Gauthier | 345/543 |
| 5,907,669 A | * | 5/1999 | Yoshiura et al. | 358/1.16 |
| 5,987,226 A | * | 11/1999 | Ishikawa et al. | 358/1.13 |
| 6,783,288 B2 | * | 8/2004 | Kato | 400/61 |
| 6,850,335 B1 | * | 2/2005 | Barry et al. | 358/1.15 |
| 2002/0089687 A1 | * | 7/2002 | Ferlitsch et al. | 358/1.15 |
| 2002/0102119 A1 | | 8/2002 | Christodoulou et al. | |
| 2002/0113989 A1 | * | 8/2002 | Ferlitsch et al. | 358/1.15 |

* cited by examiner

*Primary Examiner*—Kimberly A. Williams
*Assistant Examiner*—Michael Burleson
(74) *Attorney, Agent, or Firm*—Jon M. Dickinson, PC; Robert D. Varitz, PC (57) ABSTRACT

A distributed printing process which involves intercepting a print-job data stream, dividing that stream into data components on the basis of a pre-assessment made with respect to the availabilities and performance capabilities of plural computing devices and printer resources in a network setting, with divided components being sent for plural-peer-device implementation of at least one of the steps of rendering and rasterizing, and delivering such rasterized/rendered components to one or more selected target printers for printing.

2 Claims, 10 Drawing Sheets

PEER-TO-PEER, PLURAL-COMPUTING-DEVICE RENDERING/RASTERIZING STRUCTURE AND METHODOLOGY FOR GRID-DISTRIBUTED PRINTING

BACKGROUND AND SUMMARY OF THE INVENTION

This invention pertains to rendering and rasterizing of document print data in a printing environment network setting, and in particular, to a system and method for distributing the implementation (distribute-process implementation) of these tasks on a peer-to-peer basis to plural devices in order to increase the speed and efficiency of execution of multiple-page print-jobs.

In the flow stream of document data which resides between a creation source of that data, such as an application in a computer, and one or more printers which are going to be called upon to implement a printing job, it is typical that functional steps known as rendering and rasterizing (one or both) must typically be performed before printing can take place. It turns out that in the usual management of document print data in a flow stream, such as that mentioned above, the steps of rendering and rasterizing each requires typically a significant amount of processing time, and it is to address this issue that the method and system of the present invention are focused.

Generally speaking, and with respect to practice of the present invention, at around the time that a multiple-page print-job is defined and called for, and thus on a dynamic document-by-document basis, an assessment is made of available resources, typically, one or more computers, one or more servers, and one or more printers. More specifically, an assessment is made to review the availabilities and functional capabilities for rendering and rasterizing offered by print drivers, spoolers, print processors, and print assist, where print assist is any component added to the print subsystem, that are made available by system resources, in order to select a group of these resources to which to distribute and direct one or both of the seriatim tasks of rendering and rasterizing. Such a distribution, performed according to the invention on a peer-to-peer basis, yields a very efficient and speedy process for handling large, multi-page print jobs. Featured in the present invention is the concept of most appropriately distributing, to plural, peer-to-peer, interconnected resources (a grid), either one or both of the usual, very time-consuming tasks of first-stage rendering followed by second-stage rasterizing of print data on its way to delivery to one or more printers for execution of a print-job.

The various significant features and operational advantages afforded by the present invention will become very fully apparent as the description which now follows below is read in conjunction with the accompanying drawings.

DETAILED DESCRIPTION OF THE INVENTION

Expressed in very general terms, the unique and advantageous methodology proposed by the present invention involves distributed-process printing which takes place in a job-specific, print-flow data stream that extends between a data source, such as a document-creating application, for a print-job, one or more computing devices, and one or more target printers. The steps which are performed in this setting include (1) intercepting that data stream, (2) distributing divided data components, or portions, of that data stream for plural-peer-device (the grid) implementation (shared execution) of at least one of the seriatim steps of rendering and rasterizing, thus to create related, "implemented-step" components, and (3) delivering such implemented-step components to the one or more target printers for printing.

Figure 1:
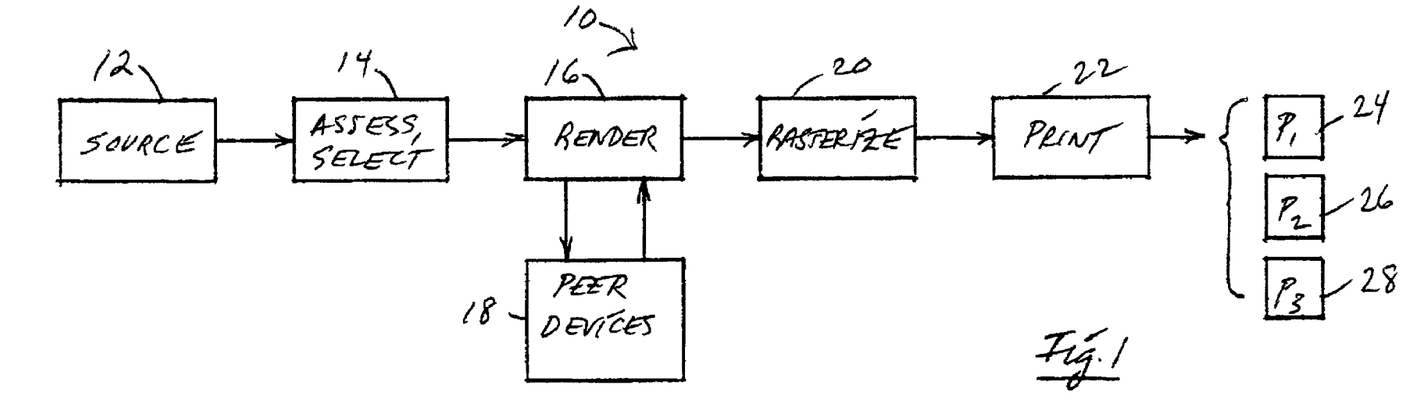
FIG. 1 is a block/schematic diagram of a system which is constructed, and which operates, in accordance with the present invention, illustrated specifically with regard to the task of employing plural, peer-to-peer resources to perform print-job data rendering.
Figure 2:
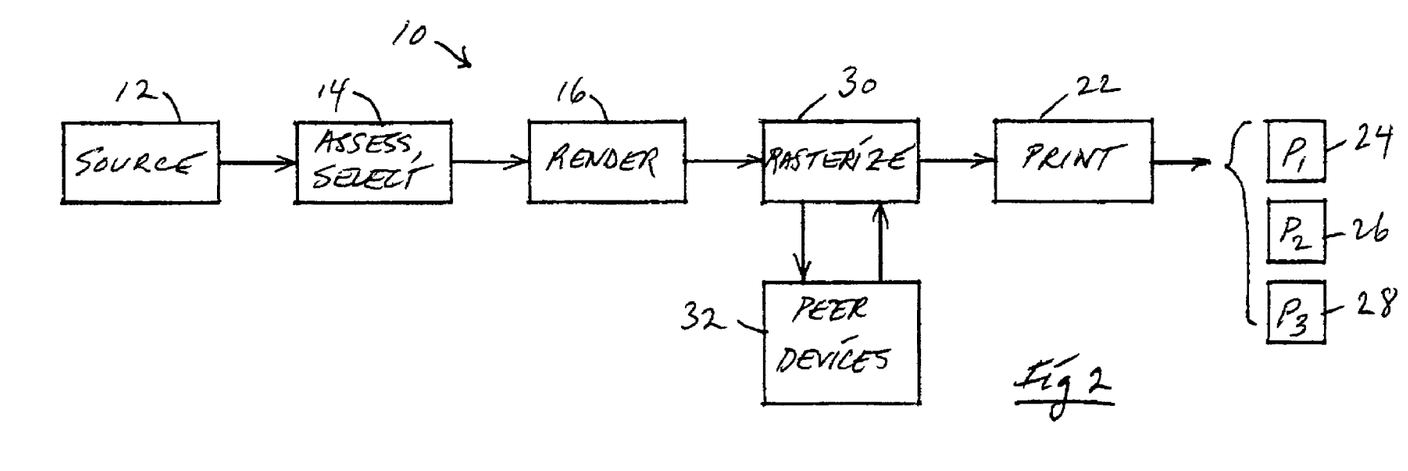
FIG. 2 is a similar block/schematic diagram of essentially the same system pictured in FIG. 1, but here illustrating peer-to-peer shared activity with respect to the rasterizing of print-job data.

FIGS. 1 and 2, which are now more specifically discussed, illustrate the overall system of the invention which implements this methodology, with FIG. 1 focusing attention on distributed rendering of print-job data, and FIG. 2 illustrating a comparable system focused on the task of distributed rasterizing of print-job data.

The other nine drawing figures herein fully illustrate, describe and enable various specific printing situations that are handled by practice of the present invention. In large measure, these nine other diagrams, legended as they are to identify operating components in a system, and steps performed, are substantially self-explanatory. Accordingly, the following text descriptions of these drawing figures is presented without over-elaboration.

Turning attention now first of all to FIG. 1, here there is shown generally at 10 a system constructed and organized, and capable of performing, in accordance with the system and methodology of the present invention. Illustrated within system 10 are a block 12 which represents a print-job source, such as a document-creating application in a computer, a block 14 which represents the performance of a resource-assessment step which is undertaken according to the invention, a block 16 which represents the performance of a distributed, first stage rendering function in conjunction with plural, peer-to-peer-connected devices represented by a block 18 (the grid), a block 20 which represents the step of seriatim second-stage rasterization, a block 22 which represents an output distribution to one or more, selected target printers in accordance with the invention, which printers are illustrated by blocks 24, 26, 28, internally labeled P1, P2, P3, respectively, in FIG. 1.

On creation of a document, such as a multi-page document, for printing in source 12, appropriate methodology which forms no particular part of the present invention is performed by block 14 to conduct a resource assessment of the current availabilities, and of the rendering and rasterizing capabilities, of the plural printers connected in system 10 and of the plural computing devices and/or servers also present in system 10 and represented generally by block 18. The purpose of this assessment, as specifically conducted in system 10 as pictured in FIG. 1, has a focus on assessing rendering capabilities along with resource availabilities. As a consequence of this assessment activity, particular ones of the available targeted printers and the available computing device resources, are selected to form a group that will continue in the processing of print data for the specific print-job now being described in conjunction with FIG. 1.

Out of a larger number of available peer devices, which are not all shown in FIG. 1, devices 18 are selected to form a target grid.

On the basis of the performed assessment, block 16 selects certain peer computer devices, and divides and distributes selected data components of the data stream emanating from source 12 for distributed plural-device first-stage rendering according to the invention. Rendered data components are re-gathered by block 16 and passed on through system 10 for seriatim processing, including second-stage rasterizing, and then distribution as output by block 22 appropriately to printers 24, 26, 28 in accordance with the respective assessments of their printing capabilities.

Distributed rendering performed by blocks 16, 18 significantly speeds the flow of data and the execution of the print-job described.

FIG. 2 illustrates a very similar situation, but here an emphasis on assessment which is performed again by a block marked 14, has a focus more specifically on resource capabilities for rasterizing print-job data. Data flowing in a data stream through system 10 as pictured in FIG. 2, is appropriately first-stage rendered in block 16, and then passed on for distributed second-stage rasterization which is handled by blocks 30, 32. Plural computing peer devices (the grid) that have been selected on the basis of assessment for sharing the rasterizing task are delivered divided data components by block 30, for rasterization, and rasterized data is returned to block 30 for passing on through the system to print distribution block 22, and thence to the one or more selected printers which here, as in FIG. 1, are printers 24, 26, 28.

Performance of a system in accordance with what is pictured in FIG. 2 is another illustration of the significant improvement of speed and efficiency with respect to handling print-job data in accordance with the present invention.

As was mentioned earlier, the specific manner or manners of performing resource assessments of availabilities and performance capabilities can be done in a number of different ways, no one of which has any special association with the present invention. Accordingly, specific approaches to assessment and selection are not detailed herein.

Figure 3:
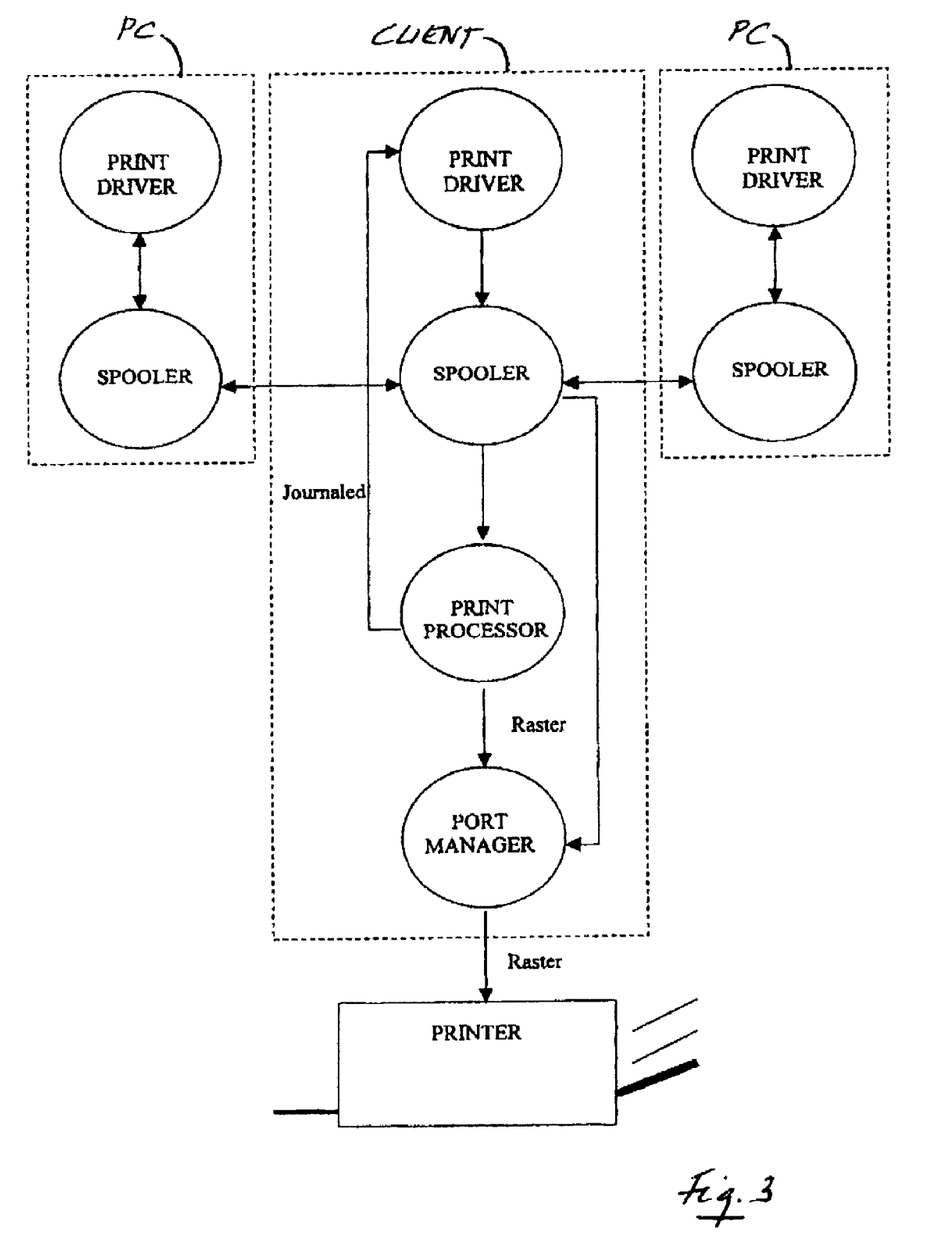
FIG. 3 is a block/schematic diagram illustrating peer-to-peer rendering and/or rasterizing in a spooler-based-to-printer mode of operation according to the invention.

Turning attention now to the remaining drawing figures, and beginning with FIG. 3, this diagram illustrates spooler-based peer-to-peer rasterization to a printing device shown as a singularity for illustration purposes in FIG. 3. In this embodiment of the invention, the client's spooler is peer-to-peer connected to one or more computing devices (two being shown), via the respective spooler processes made available in these peer-connected devices. The printer driver on the client computing device pictured in FIG. 3 spools journaled data to the client spooler. As illustrated in FIG. 3, the client spooler is connected, as just mentioned, to the spool process in the two illustrated computing devices through a typical peer-to-peer connection, such as TCP/IP.

The client spooler partitions the print data into sheets, and then distributes these sheets (data components) to be appropriately rendered and/or rasterized in a divided fashion, with rendering and/or rasterization shared by the client and the plural connected PC computing devices shown in FIG. 3.

Ultimately, the distributed rendered and/or rasterized data components are returned to the client, re-assembled and passed along through the system to one or more printing device(s) which, as was just mentioned above, is represented as a singularity in FIG. 3. It should be recognized that the single printing device illustrated in FIG. 3 can represent a plurality of such printing devices that have been selected by pre-assessment and selection as earlier described.

FIGS. 4–8, inclusive, as can be seen, present themselves in very much the same fashion, as does FIG. 3. These other drawing figures illustrate, as did FIG. 3 with respect to the type of operation described for it, five other kinds of typical operations that can be performed in accordance with the invention to achieve distribution economies with regard to rendering/rasterizing. As was also mentioned earlier, and as is clearly true with respect to the content of FIG. 3, the systems and steps illustrated in FIGS. 4–8, inclusive, are quite self-explanatory.

Figure 4:
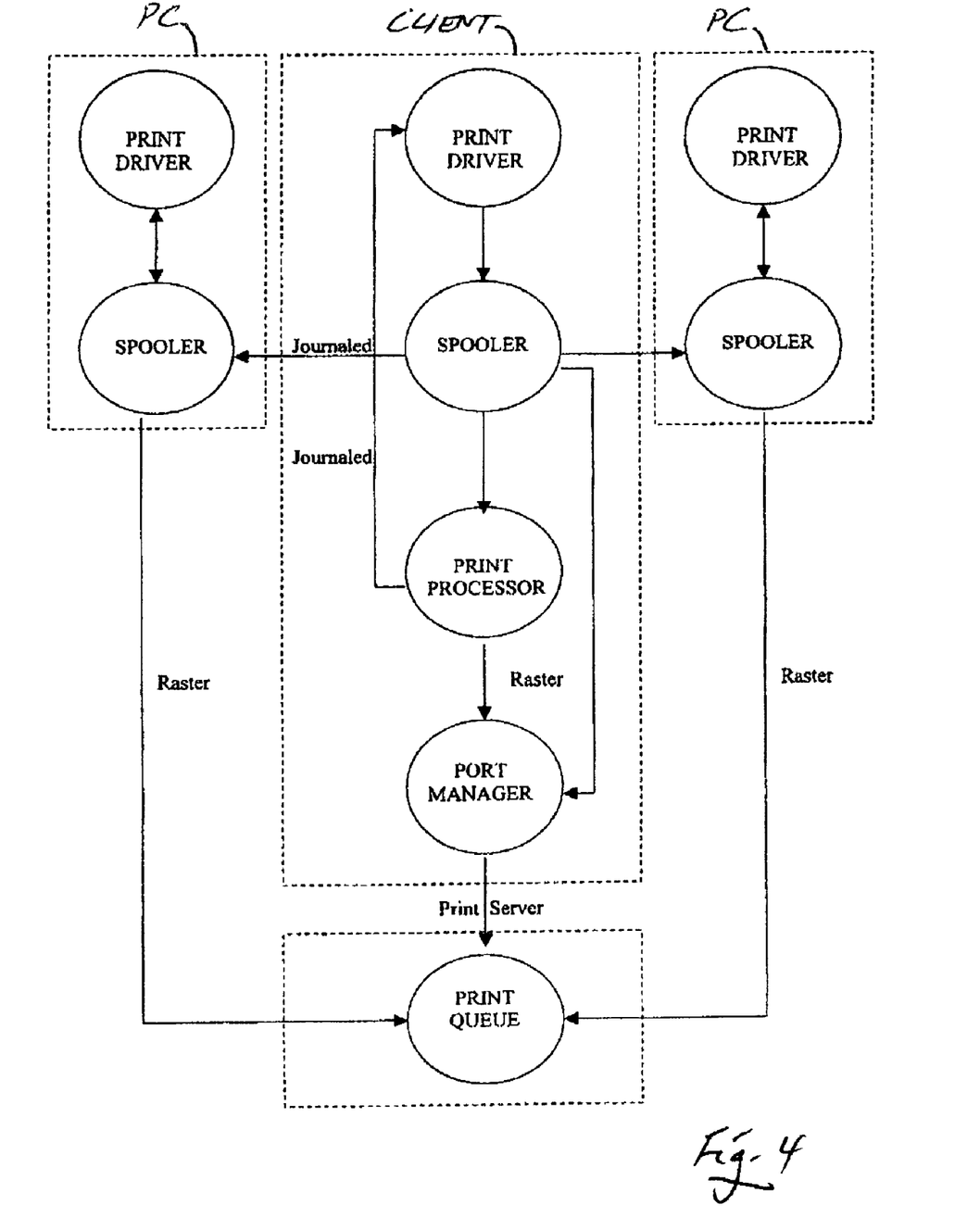
FIG. 4 is a block/schematic diagram illustrating peer-to-peer rendering and/or rasterizing in a spooler-based-to-print server mode of operation according to the invention.
Figure 5:
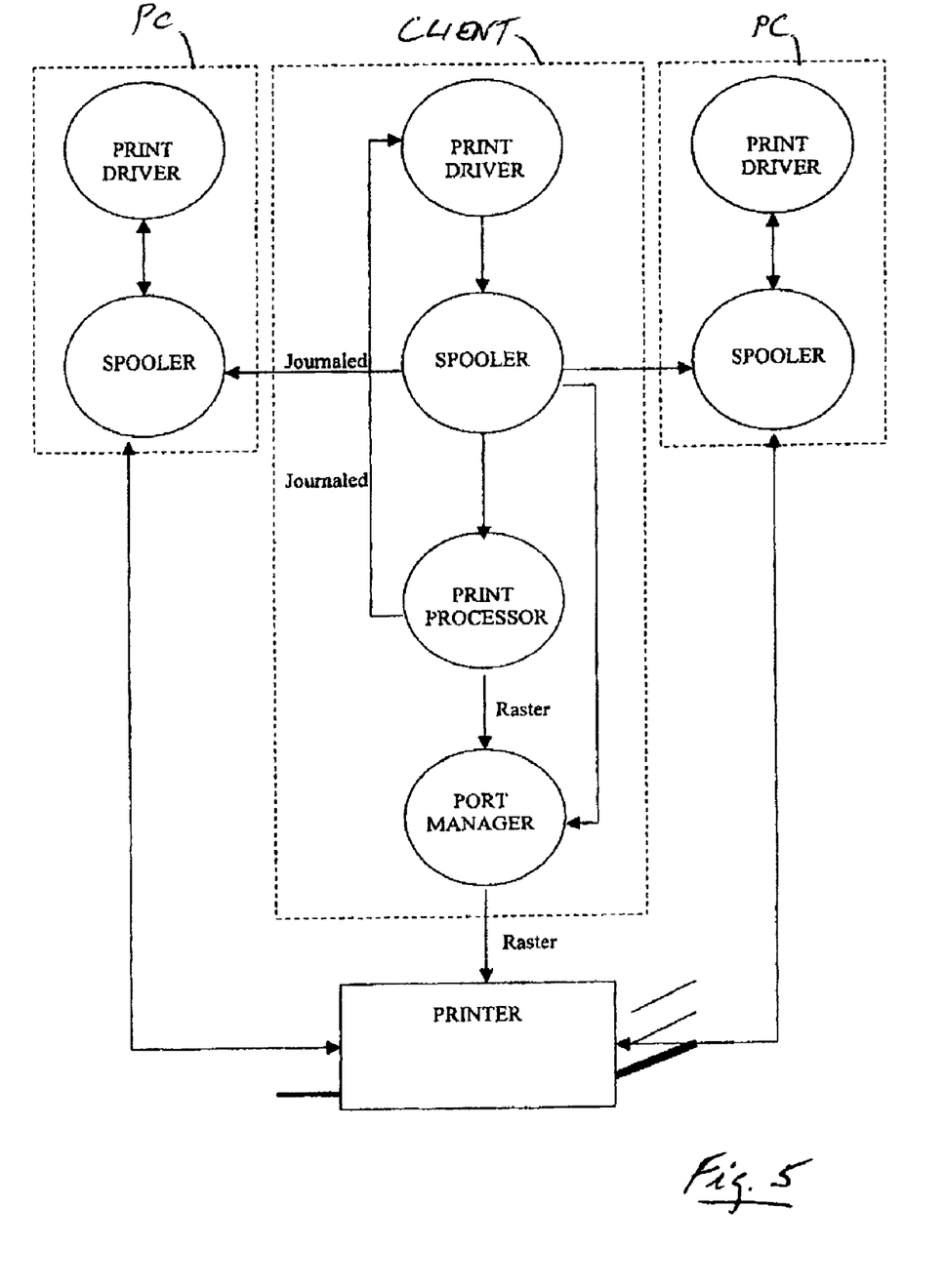
FIG. 5 is a block/schematic diagram illustrating peer-to-peer rendering and/or rasterizing in what is referred to herein as a spooler-based, pull-print mode of operation according to the invention.
Figure 6:
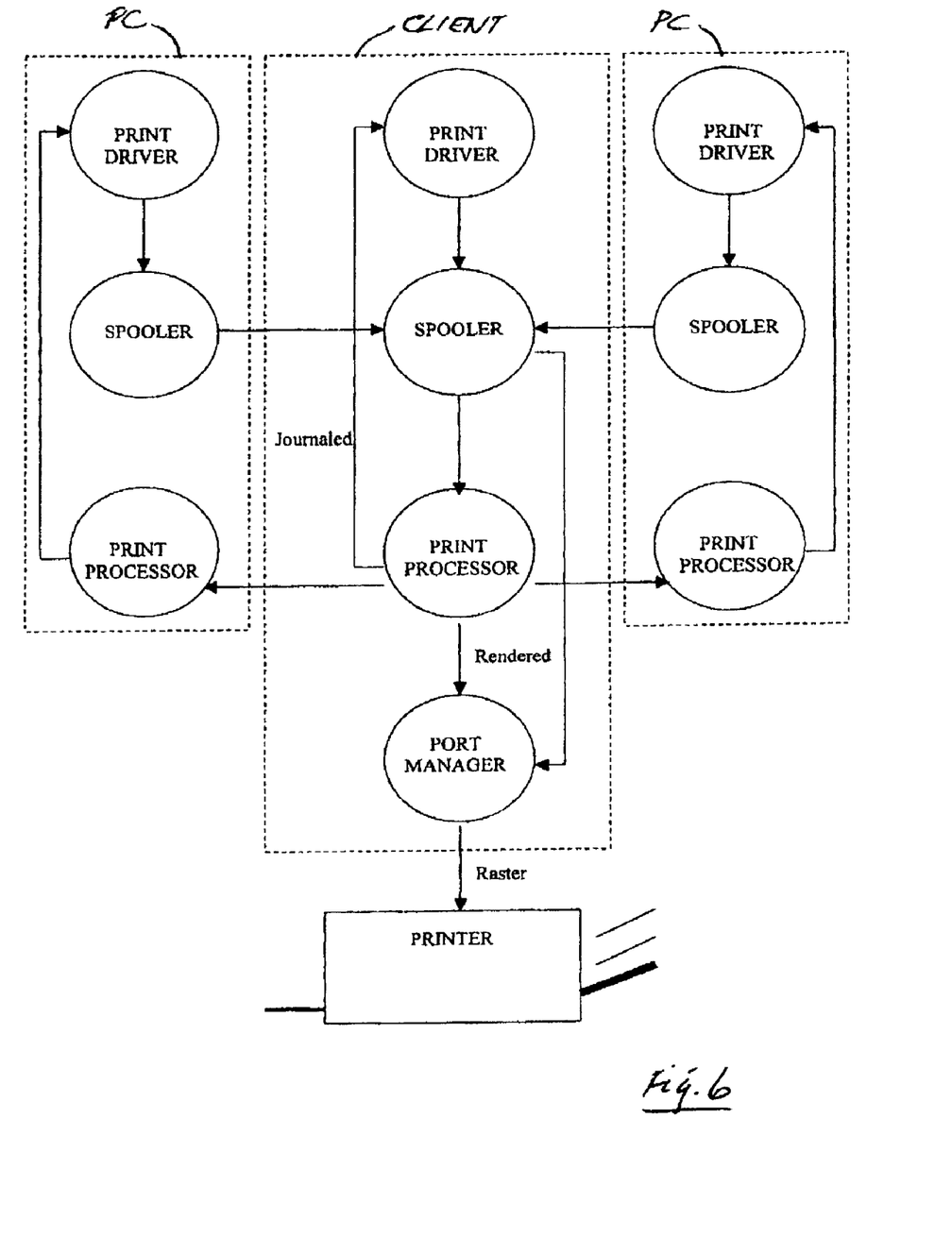
FIG. 6 is a block/schematic diagram illustrating peer-to-peer rendering and/or rasterizing performed in a mode of operation referred to as print-processor-based-to-printer operation in accordance with the present invention.
Figure 7:
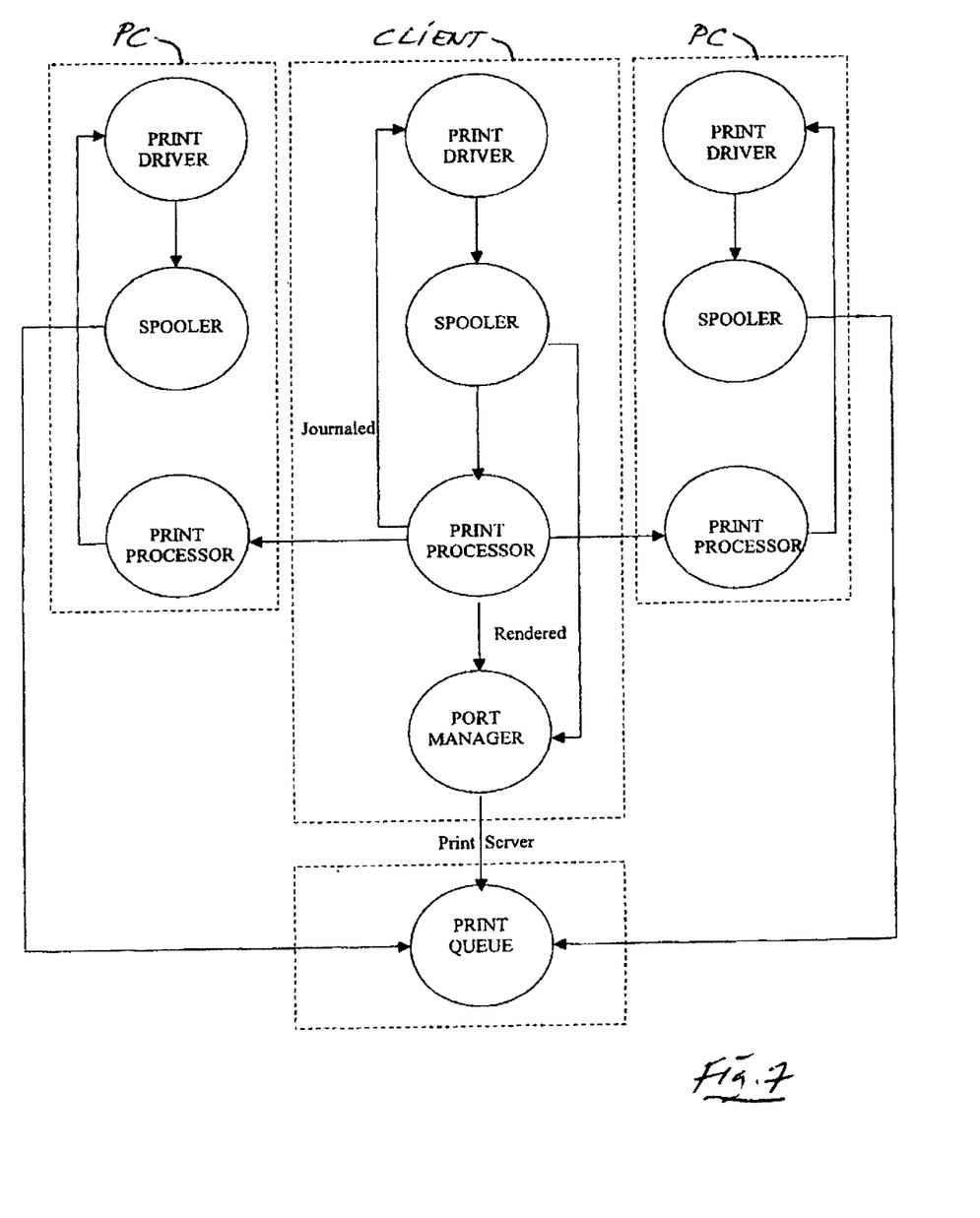
FIG. 7 is a block/schematic diagram of peer-to-peer rendering and/or rasterizing in what is called herein a print-processor-based-to-print server mode of behavior according to the invention.
Figure 8:
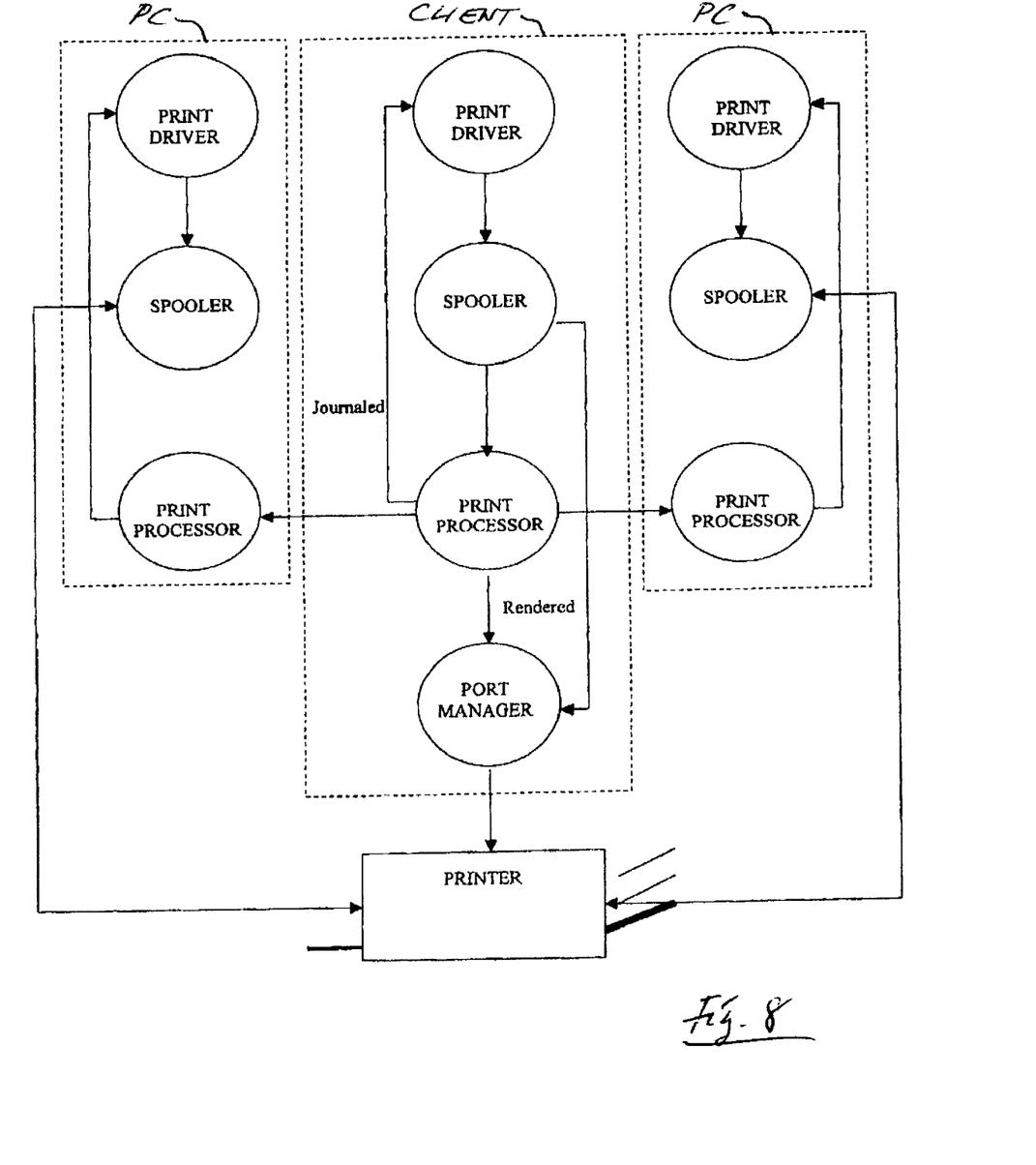
FIG. 8 is a block/schematic diagram of peer-to-peer rendering and/or rasterizing in a mode of operation according to the invention referred herein as print-processor-based, pull-print behavior.

FIG. 4 illustrates peer-to-peer distributed rendering/rasterizing in what is known as a spooler-based-to-print server mode of operation. FIG. 5 illustrates peer-to-peer distributed rendering/rasterizing performed in accordance with the invention in what is known as a spooler-based, pull-print mode of operation. FIG. 6 illustrates print-processor-based-to-printer, peer-to-peer rendering/rasterizing in a distributed manner according to practice of the present invention. FIG. 7 illustrates another print server situation utilizing the present invention, and specifically it illustrates peer-to-peer rendering/rasterizing in what is called a print-processor-based-to-print server mode of behavior. FIG. 8 shows a print-processor-based, pull-print mode of operation employing peer-to-peer distributed rendering/rasterizing according to practice of the invention.

Figure 9:
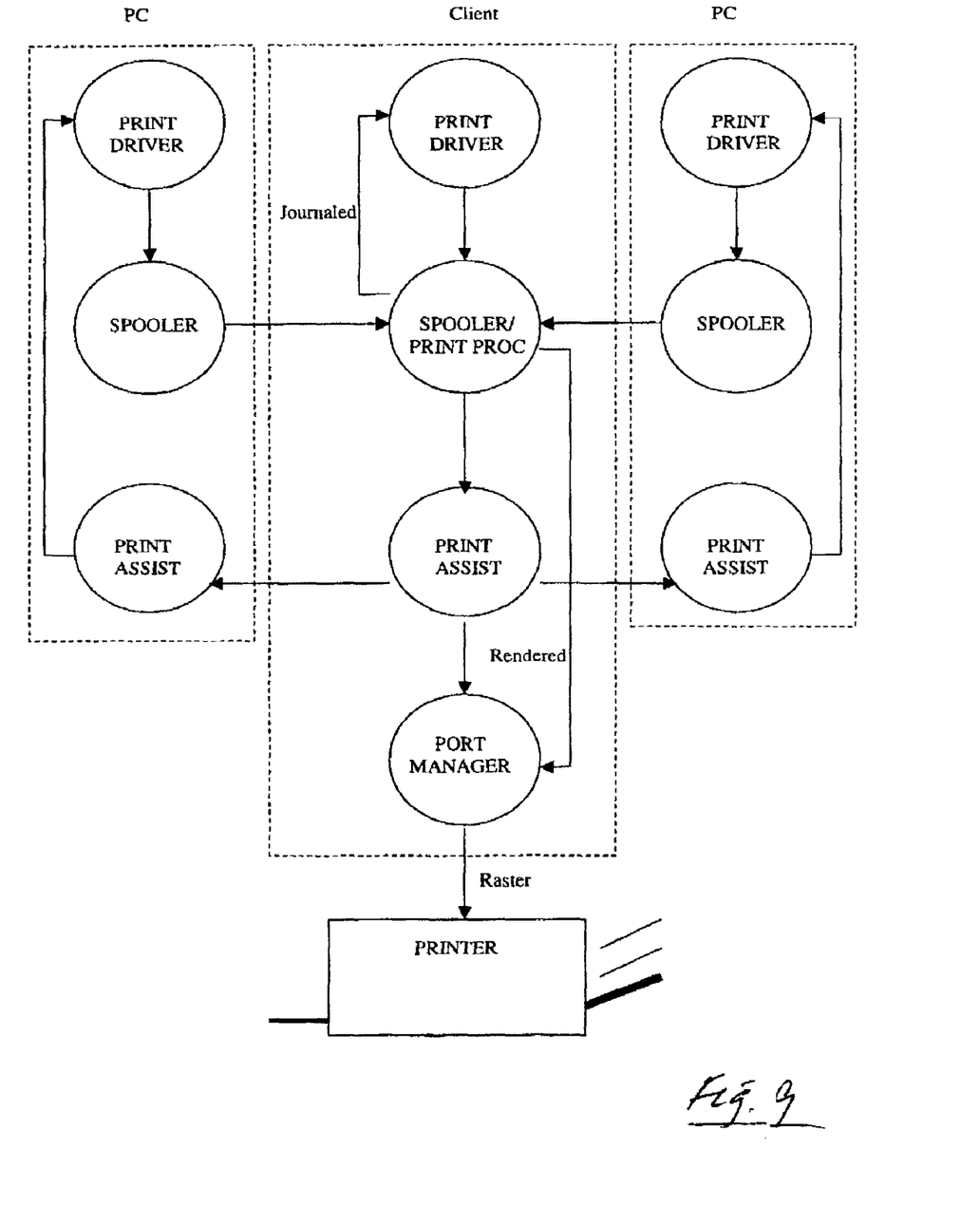
FIG. 9 is a block/schematic diagram of peer-to-peer rendering and/or rasterizing in a mode of operation known as print-assist-based-to-printer operation, in accordance with the invention.
Figure 10:
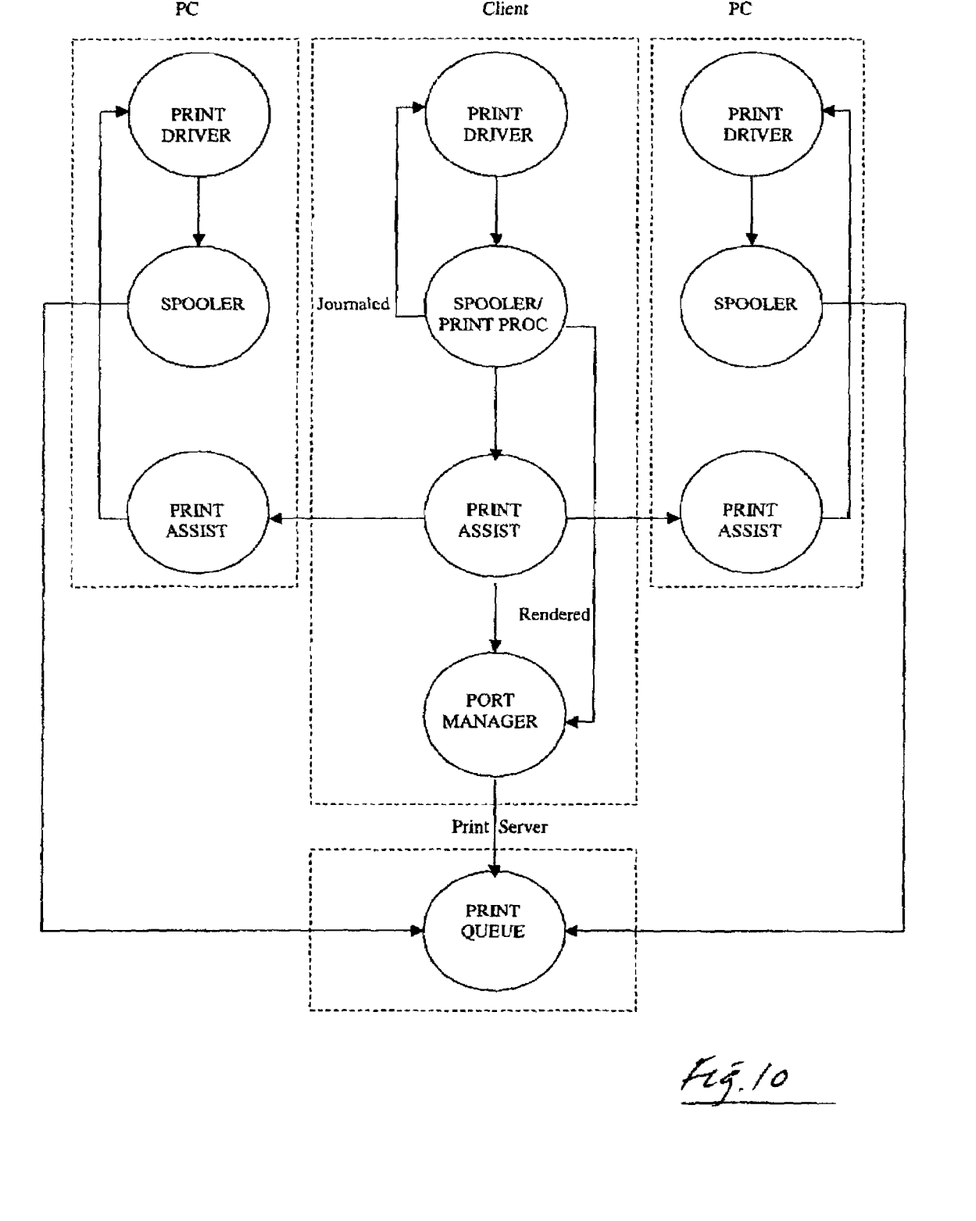
FIG. 10 is a block/schematic diagram illustrating peer-to-peer rendering and/or rasterizing in a behavioral mode referred to as print-assist-based-to-print server operation, according to the invention.
Figure 11:
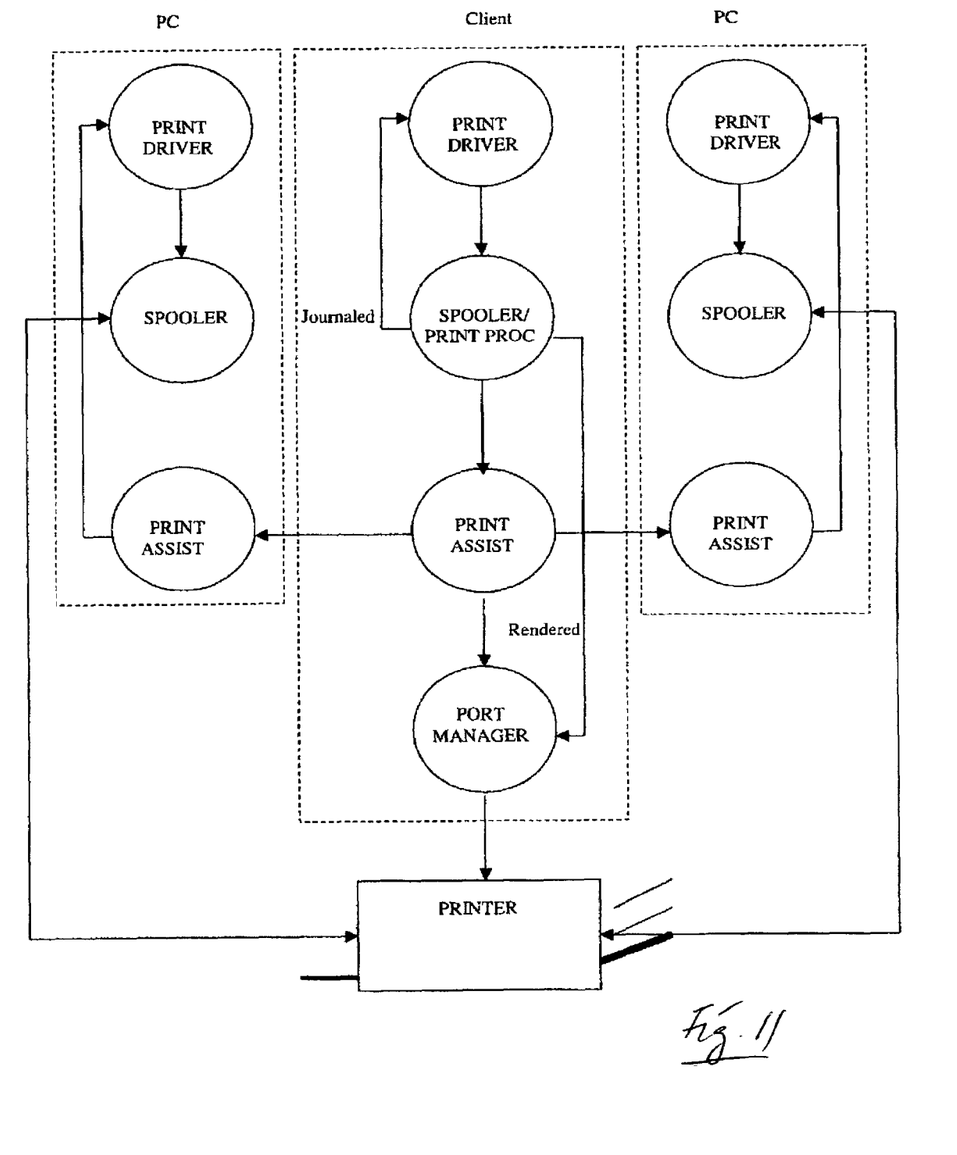
FIG. 11 is a block/schematic diagram of peer-to-peer rendering and/or rasterizing in a print-assist-based, pull-print mode of operation, in accordance with the present invention.

FIG. 9 portrays peer-to-peer distributed rendering and/or rasterizing in what is called a print-assist-based-to-printer mode of operation. FIG. 10 pictures distributed peer-to-peer rendering and/or rasterizing in a print-assist-to-print server operating mode. FIG. 11 shows distributed peer-to-peer rendering and/or rasterizing in a print-assist-based, pull-print behavioral mode.

It will thus be apparent that the system and methodology of the present invention, illustrated and described as it just has been with respect to a large number of otherwise conventional printing operations, offer a significant time-savings improvement, and important efficiency improvements, in the handling of print job data, and particularly with respect to the handling of a large body of such data in a large print-job. The steps of rendering and rasterizing, typical problematic bottlenecks in larger printing operations, become appropriately distributed for shared handling according to the invention. From print-job to print-job, currently performed system resource assessments give up-to-the-minute information which leads to the most efficient distribution of rendering and rasterizing.

While a preferred invention system and methodology have been illustrated and described herein, it is appreciated that variations and modification may be made without departing from the spirit of the invention.

I claim:

1. Distributed-process, rendering-followed-by-rasterizing printing methodology intrinsically capable of seriatim (a) print-job data distribution for first-stage rendering, and (b) print-job data distribution for second-stage rasterizing, and thus intrinsically capable of handling both device-independent and device-dependent data, performed in an environment including plural computing devices, and involving a job-specific, print-flow data stream that flows between a data source for the job and one or more target printers, said printing comprising, intercepting the data stream, dividing that stream into individual data components, dynamically assessing the respective availabilities and performance capabilities of the computing devices and of the one or more target printers, distributing those components as respective singularities to selected ones of the plural computing devices for the purpose of implementing in those devices, as desired, either the seriatim step of rendering, or the step of rasterizing, or both such steps, thus to create related, implemented-step components including, as appropriate, distributed rendered components and/or distributed rasterized components, creating such implemented-step components, and appropriately and ultimately delivering the implemented-step components to the one or more target printers for printing in a manner which collectively and most efficiently employs the mentioned assessed availabilities and capabilities.

2. The method of claim 1, wherein each of the steps of rendering and rasterizing is performed in one of the manners including (a) peer-to-peer, spooler-based-to-printer, (b) peer-to-peer, spooler-based-to-print server, (c) peer-to-peer, spooler-based pull-print, (d) peer-to-peer, print-processor-based-to-printer, (e) peer-to-peer, print-processor-based-to-print server, (f) peer-to-peer, print-processor-based pull-print, (g) peer-to-peer, print-assist-based-to-printer, (h) peer-to-peer, print-assist-based-to-print server, and (i) print-assist-based pull-print.

* * * * *